United States Patent
Felder et al.

(10) Patent No.: US 10,674,729 B2
(45) Date of Patent: Jun. 9, 2020

(54) SYNERGISTIC COMBINATION OF 3-IODO-2-PROPYNYL-BUTYLCARBAMATE AND DIAMINE

(71) Applicant: DOW GLOBAL TECHNOLOGIES LLC, Midland, MI (US)

(72) Inventors: Patrick T. Felder, Horgen (CH); Valerie Murset, Horgen (CH); Alessandro Vezzoli, Horgen (CH); Maciej Szymeczko, Horgen (CH); Emmanuelle Christine Yvon, Horgen (CH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 16/307,297

(22) PCT Filed: Jun. 28, 2017

(86) PCT No.: PCT/US2017/039640
§ 371 (c)(1),
(2) Date: Dec. 5, 2018

(87) PCT Pub. No.: WO2018/005588
PCT Pub. Date: Jan. 4, 2018

(65) Prior Publication Data
US 2019/0133130 A1    May 9, 2019

Related U.S. Application Data

(60) Provisional application No. 62/356,910, filed on Jun. 30, 2016.

(51) Int. Cl.
*A01N 47/12*     (2006.01)
*A01N 33/04*     (2006.01)
*C09D 5/14*      (2006.01)

(52) U.S. Cl.
CPC ............. *A01N 47/12* (2013.01); *A01N 33/04* (2013.01); *C09D 5/14* (2013.01)

(58) Field of Classification Search
CPC .......... A01N 47/12; A01N 33/04; C09D 5/14
USPC ....................................................... 514/479
See application file for complete search history.

(56) References Cited

U.S. PATENT DOCUMENTS

2003/0228373 A1   12/2003   Ludensky et al.
2007/0007811 A1    1/2007   Chung

FOREIGN PATENT DOCUMENTS

WO   2016137830 A1   9/2016

*Primary Examiner* — Kristin A Vajda

(57) ABSTRACT

A synergistic antimicrobial composition containing 3-iodo-2-propynyl-butylcarbamate and diamine is provided. Also, a coating, a method of inhibiting the growth of or controlling the growth of microorganisms in an aqueous media, and a dry film containing 3-iodo-2-propynyl-butylcarbamate and diamine are further provided.

7 Claims, No Drawings

SYNERGISTIC COMBINATION OF 3-IODO-2-PROPYNYL-BUTYLCARBAMATE AND DIAMINE

This invention relates to combinations of biocides, the combinations having greater activity than would be observed for the individual antimicrobial compounds.

Use of combinations of at least two antimicrobial compounds can broaden potential markets, reduce use concentrations and costs, and reduce waste. In some cases, commercial antimicrobial compounds cannot provide effective control of microorganisms, even at high use concentrations, due to weak activity against certain types of microorganisms, or relatively slow antimicrobial action, or instability under certain conditions such as high temperature and high pH. Combinations of different antimicrobial compounds are sometimes used to provide overall control of microorganisms or to provide the same level of microbial control at lower use rates in a particular end use environment. Additionally, synergy has been found to be an unpredictable phenomenon. Often like compounds display varying synergistic profiles when combined with a particular active. It may be that no synergy is evidenced or it may be that synergy exists but over a different synergistic range. Because of this observation, it is difficult, if not impossible to draw conclusions regarding the synergistic profile of one compound based upon the synergistic profile of a like compound. Thus more synergistic combinations and their synergistic ranges must be discovered.

On such example of synergy is found in U.S. Pat. App. Pub. No. 2007/0078118. This reference discloses synergistic combinations of N-methyl-1,2-benzisothiazolin-3-one (MBIT) with other biocides. There still exists a need for additional combinations of antimicrobial compounds having enhanced activity to provide effective control of microorganisms. The problem addressed by this invention is to provide such combinations of antimicrobial compounds.

In the present invention there is provided a synergistic antimicrobial composition comprising 3-iodo-2-propynyl-butylcarbamate (also known as iodopropynyl butylcarbamate and IPBC) (CAS registry number is 55406-53-6) and N-(3-Aminopropyl)-N-dodecylpropane-1,3-diamine (also known as diamine) (CAS registry number is 2372-82-9).

The invention further provides a method of inhibiting the growth of or controlling the growth of microorganisms in an aqueous media, the method comprising the step of adding a synergistic antimicrobial composition comprising IPBC and diamine Also, a coating, and a dry film containing 3-iodo-2-propynyl-butylcarbamate and diamine are provided.

The following is a detailed description of the invention.

As used herein, the following terms have the designated definitions, unless the context clearly indicates otherwise.

The term "antimicrobial compound" refers to a compound capable of inhibiting the growth of or controlling the growth of microorganisms; antimicrobial compounds include bactericides, bacteriostats, fungicides, fungistats, algaecides and algistats, depending on the dose level applied, system conditions and the level of microbial control desired. Such term "antimicrobial compound" as used herein is synonymous with the term "biocide".

The term "microorganism" includes, for example, fungi (such as yeast and mold), bacteria and algae.

The following abbreviations are used throughout the specification: ppm=parts per million by weight (weight/weight), mL=milliliter, ATCC=American Type Culture Collection, SAG=Culture Collection of Algae at Goettingen University, CCAP=Culture Collection of Algae and Protozoa, DSMZ=Deutsche Sammlung von Mikroorganismen and Zellkulturen, and MIC=minimum inhibitory concentration.

Unless otherwise specified, temperatures are in degrees centigrade (° C.), and references to percentages are by weight (wt. %). Percentages of antimicrobial compounds in the composition of this invention are based on the total weight of active ingredients in the composition, i.e., the antimicrobial compounds themselves, exclusive of any amounts of solvents, carriers, dispersants, stabilizers or other materials which may be present.

As used herein, "IPBC" is 3-Iodo-2-propynyl-butylcarbamate (CAS registry number 55406-53-6).

As used herein, "Diamine" is N-(3-Aminopropyl)-N-dodecylpropane-1,3-diamine (CAS registry number is 2372-82-9)

When a ratio is the herein to be "X:1 or higher," it is meant that the ratio is Y:1, where Y is X or greater, and when a ratio is the herein to be "X:1 or lower," it is meant that the ratio is Z:1, where Z is X or less. The same logic follows for ratios that are "1:X or higher" and "1:X or lower".

The present invention is a composition that contains both IPBC and diamine. It has been surprisingly found that compositions that contain both IPBC and diamine are synergistically effective as biocides. In the present invention, the weight ratio of the IPBC to diamine is from 1:10 to 10:1 alternatively from 1:1 to 1:10 and further alternatively from 10:1 to 1:1.

In some embodiments of the invention, the antimicrobial combination of this invention is useful for inhibiting the growth of or controlling the growth of microorganisms in an aqueous media. Such aqueous media includes but is not limited to industrial water and water containing/contaminated media, such as cooling water, air washer, heat exchangers, boiler water, pulp and paper mill water, other industrial process water media such as: ballast water, wastewater, metalworking fluids, oil and gas, latex, paint, coatings, adhesives, inks, tape joint compounds, pigment, water-based slurries, personal care and household products such as detergent, filtration systems (including reverse osmosis and ultrafiltration systems), toilet bowel, textiles, leather and leather production system, or a system used therewith. In one embodiment the antimicrobial composition is used as an in-can preservative.

Typically, the amount of the biocide combinations of the present invention for inhibiting the growth of or controlling the growth microorganisms is from 10 ppm to 5,000 ppm active ingredient. In some embodiments of the invention, the active ingredients of the composition are present in an amount of at least 20 ppm, alternatively at least 50 ppm, alternatively at least 100 ppm, alternatively at least 150 ppm, alternatively at least 200 ppm. In some embodiments, the active ingredients of the composition are present in an amount of no more than 2,000 ppm, alternatively no more than 1,000 ppm, alternatively no more than 500 ppm, alternatively no more than 400 ppm, alternatively no more than 300 ppm, alternatively no more than 250 ppm, alternatively no more than 200 ppm, alternatively no more than 100 ppm, alternatively no more than 50 ppm. Concentrations mentioned above are in a liquid composition containing the biocide combinations.

The present invention also encompasses a method for inhibiting the growth of or controlling the growth of microorganisms in the use areas described above, especially in in-can preservative applications, by incorporating the claimed biocide combination into the materials.

The composition of the present invention contains IPBC and diamine. It is contemplated that some embodiments may contain one or more additional antimicrobial compound. The following are examples of the present invention.

The synergism of the biocides combination of the present invention was determined using the method described by Kull, F. C., et. al in *Applied Microbiology* 9:538-541 (1961). The formula to calculate the synergy index (SI) is $$Qa/QA + Qb/QB = SI$$

Where

QA=concentration of compound A in ppm, acting alone produced an end point (growth/no growth)

Qa=concentration of compound A in ppm, in the mixture, which produced an end point (growth/no growth)

QB=concentration of compound B in ppm, acting alone produced an end point (growth/no growth)

Qb=concentration of compound B in ppm, in the mixture, which produced an end point (growth/no growth)

Synergism within two biocides is demonstrated when the SI has a value less than 1. The mixtures showed an additive effect if SI is equal to 1 and antagonistic if SI is greater than 1.

The Minimum Inhibitory Test (MIC) is designed to evaluate the lowest concentration of a biocide, biocide blend or biocide combination to prevent microorganisms from growing in a defined broth.

The MIC and synergy testing was carried out as follows:

1. The test was executed with a Hamilton MLStarPlus robot using automated turbidity reading with BioTek Synergy H4 plate reader.
2. Biocide plates were prepared in 2.2 ml deep well plates by transferring and diluting biocides from stock solutions to first row of the plates. The concentrations of biocides in stock bottles were adjusted to be 20× more concentrated than the highest desired concentration.
3. Then 15 subsequent serial dilutions with dilution factor 1.3 were performed resulting in 16 different concentrations for each system.
4. In the next step serially diluted biocide systems were transferred to the media blocks containing 850 µl of tryptic soy broth, comprising, Casein (pancreatic digest) 17 g/L, Soya peptone (papaic digest) 3 g/L, Sodium chloride 5 g/L, Dipotassium phosphate 2.5 g/L, Dextrose 2.5 g/L ("TSB") containing different concentrations of Mowiol 18-88 partially hydrolyzed polyvinylacetate surfactant, commercially available from Kuraray Europe GmbH in each well. In case of single biocide systems 100 µl were transferred and in case of biocide combinations 50 µl of each biocide dilution were transferred to the media, resulting in 950 µl of final volume of media+biocides and 9.5 times dilution of the biocides from the biocide plate. At this point, the concentrations of all biocides in media were 1.053× final concentration.
5. After preparation and mixing of the described systems, 3 aliquots of 190 µl were prepared in 96-well microtiter plates.
6. Preparation of the microbe suspension:
   Bacterial cultures:

| | | |
|---|---|---|
| *Pseudomonas aeruginosa* | DSM # 939 | ATCC# 15442 |
| *Staphylococcus aureus* | DSM # 799 | ATCC# 6538 |

The culture was maintained as a glycerol stock at −80° C. in cryovials. A cryovial was thawed and then 100 µl spread on a TSB agar plate. After incubation for 1 day at 30° C. the bacteria were harvested with buffer at pH 7.3. A total viable count on TSB plate was carried out and bacterial suspension was diluted in buffer in order to deliver ~2×10$^7$ CFU/ml.

Yeast culture:

| | | |
|---|---|---|
| *Candida albicans* | DSM #1386 | ATCC# 10231 |

The cultures were maintained as glycerol stocks at −80° C. in cryovials, are thawed and then 100 µl spread on MEA (malt extract agar) petri dishes.

The yeast strain plates were incubated at 28° C. for 1-2 days then harvested with buffer pH 5.0.

Based on total viable count results, the inoculum was prepared.

7. Each test sample (190 µl) was inoculated with the 10 µl of microbe suspension to provide a level of ~1×10$^6$ CFU/ml of the yeast species.
8. The test samples were mixed and incubated at 30° C. for 2 days (48 hours) when tested against bacteria and 3 days (72 hours), respectively, when tested against yeast.
9. Growth of the micro-organisms leads to turbidity after incubation, clarity indicates no growth. Reading of the results was carried out by measuring absorbance at 600 nm for each sample at the beginning of the test ($t_{zero}$) and after incubation ($t_{endpoint}$). $t_{endpoint}$ was chosen at 48 hours for bacteria and 72 hours for yeast. The difference in absorbance between $t_{endpoint}$ and $t_{zero}$ was used to assign a score ("1" if Δ>0.2, confirming growth, and "0" if Δ≤0.2, confirming no growth) from which the MIC values were derived. The lowest concentration that showed no growth (score of "0") in the broth after incubation is taken as the MIC value.

The results of single biocide and combination of two biocides tested against bacteria and yeast are presented in Tables 1 and 2.

TABLE 1

MIC results for single biocides and combinations of two biocides (in ppm):

| Active ingredients and ratio | *Staphylococcus aureus* (DSMZ#799) | *Pseudomonas aeruginosa* (DSMZ#939) | *Candida albicans* (DSMZ#1386) |
|---|---|---|---|
| IPBC (single) | 21.6 | 1400.0 | 6.6 |
| Diamine (single) | 16.7 | 47.8 | 61.5 |
| IPBC/Diamine 1:1 | 5.8:5.8 | 28.3:28.3 | 2.6:2.6 |
| IPBC/Diamine 1:10 | 1.3:12.9 | 6.2:62.2 | 1.0:9.8 |
| IPBC/Diamine 10:1 | 9.8:1.0 | 223.1:22.3 | 5.1:0.5 |

TABLE 2

Calculated synergy indices for the Combinations in Table 1

| Active ingredients and ratio | *Staphylococcus aureus* (DSMZ#799) | *Pseudomonas aeruginosa* (DSMZ#939) | *Candida albicans* (DSMZ#1386) |
|---|---|---|---|
| IPBC/Diamine 1:1 | 0.62 | 0.61 | 0.44 |
| IPBC/Diamine 1:10 | 0.83 | 1.30 | 0.31 |
| IPBC/Diamine 10:1 | 0.51 | 0.63 | 0.78 |

The invention claimed is:

1. A synergistic antimicrobial composition comprising 3-iodo-2-propynyl-butylcarbamate and diamine.

2. The synergistic antimicrobial composition of claim 1, wherein the weight ratio of the 3-iodo-2-propynyl-butylcarbamate to diamine is from 1:10 to 10:1.

3. A method of inhibiting the growth of or controlling the growth of microorganisms in an aqueous media comprising adding the synergistic antimicrobial composition of claim 1 to the aqueous media.

4. The method of claim 3 wherein the aqueous media is a coating.

5. A coating composition comprising the synergistic antimicrobial composition of claim 1.

6. A coating composition comprising the synergistic antimicrobial composition of claim 2.

7. A dry film made by a process comprising applying a layer of the coating composition of claim 5 to a substrate and drying the coating composition or allowing the coating composition to dry.

* * * * *